(12) United States Patent
Nishigaki et al.

(10) Patent No.: US 12,103,856 B2
(45) Date of Patent: Oct. 1, 2024

(54) METHOD FOR MANUFACTURING HONEYCOMB STRUCTURE CONTAINING SILICON CARBIDE

(71) Applicant: NGK INSULATORS, LTD., Nagoya (JP)

(72) Inventors: Taku Nishigaki, Nagoya (JP); Suguru Kodama, Nagoya (JP); Keisuke Kimura, Ichinomiya (JP)

(73) Assignee: NGK INSULATORS, LTD., Nagoya (JP)

( * ) Notice: Subject to any disclaimer, the term of this patent is extended or adjusted under 35 U.S.C. 154(b) by 553 days.

(21) Appl. No.: 17/182,354

(22) Filed: Feb. 23, 2021

(65) Prior Publication Data

US 2021/0300767 A1    Sep. 30, 2021

(30) Foreign Application Priority Data

Mar. 25, 2020 (JP) ................................ 2020-054897

(51) Int. Cl.
| | |
|---|---|
| *C01B 32/963* | (2017.01) |
| *B01J 27/224* | (2006.01) |
| *B01J 35/40* | (2024.01) |
| *B01J 35/56* | (2024.01) |
| *B01J 37/04* | (2006.01) |

(52) U.S. Cl.
CPC ........... *C01B 32/963* (2017.08); *B01J 27/224* (2013.01); *B01J 35/40* (2024.01); *B01J 35/56* (2024.01); *B01J 37/04* (2013.01); *C01P 2004/61* (2013.01)

(58) Field of Classification Search
None
See application file for complete search history.

(56) References Cited

U.S. PATENT DOCUMENTS

2016/0137513 A1    5/2016   Hase

FOREIGN PATENT DOCUMENTS

| CN | 105324332 A | 2/2016 |
| EP | 2 363 385 A1 | 9/2011 |
| JP | 2011-168438 A1 | 9/2011 |
| JP | 2014101253 A | * 6/2014 |

OTHER PUBLICATIONS

Machine translation of Jungo et al., JP-2011168438-A (Year: 2011).*
Machine translation of Tatetomo et al., JP 2014101253 A (Year: 2014).*

* cited by examiner

*Primary Examiner* — Melissa S Swain
*Assistant Examiner* — Keling Zhang
(74) *Attorney, Agent, or Firm* — BURR PATENT LAW, PLLC

(57) ABSTRACT

A method for manufacturing a honeycomb structure containing silicon carbide, including blending a recycled raw material derived from a material constituting a first honeycomb structure containing silicon carbide in a process after firing as a part of an initial raw material for a second honeycomb structure containing silicon carbide, wherein the initial raw material comprises silicon carbide and metallic silicon; and the recycled raw material is a powder recovered from the material constituting the first honeycomb structure containing silicon carbide in the process after firing, and after the recovering, a particle size is adjusted so that a 10% diameter (D10) is 10 μm or more and a 50% diameter (D50) is 35 μm or less when a cumulative particle size distribution on a volume basis is measured by a laser diffraction/scattering method.

4 Claims, No Drawings

METHOD FOR MANUFACTURING HONEYCOMB STRUCTURE CONTAINING SILICON CARBIDE

FIELD OF THE INVENTION

The present invention relates to a method for manufacturing a honeycomb structure containing silicon carbide. In particular, the present invention relates to a method for manufacturing a honeycomb structure containing silicon carbide which is used for a filter or a catalyst carrier for purifying automobile exhaust gas, or the like.

BACKGROUND OF THE INVENTION

Silicon carbide (SiC) has been used for various ceramic products such as heat sinks, exhaust gas filters, catalyst carriers, sliding components, nozzles, heat exchangers, and components for semiconductor manufacturing devices by taking advantage of its characteristics such as high heat resistance, high hardness, excellent chemical resistance, and excellent abrasion resistance. Among these, a Si-impregnated SiC material in which a silicon carbide porous body is impregnated with metallic silicon has an application as a heat sink material due to its excellent thermal conductivity. Further, a Si-bonded SiC material in which silicon carbide particles are bonded by metallic silicon has characteristics of excellent heat resistance, thermal shock resistance, and oxidation resistance, and is known as a typical constituent material of a honeycomb structure used for a filter for collecting fine particles in exhaust gas of an internal combustion engine, a boiler or the like, or used for a catalyst carrier of an exhaust gas purifying catalyst, or the like.

The honeycomb structure containing silicon carbide can be manufactured, for example, by adding a metallic silicon (silicon), an organic binder, and an alkaline earth metal to a silicon carbide powder; mixing and kneading them to obtain a green body; extrusion molding the green body into a honeycomb formed body having a predetermined honeycomb structure, calcining the obtained honeycomb formed body to remove the organic binder in the formed body; and thereafter firing the formed body.

Such a honeycomb structure containing silicon carbide may be provided as an integrally formed article, but in order to improve thermal shock resistance, a plurality of honeycomb structure segments may be joined with a joining material after firing. In the latter case, steps of grinding the outer peripheral portion of the segment joint body formed by joining a plurality of honeycomb structure segments to obtain a desired shape (for example, a cylindrical shape), coating the outer peripheral side surface of the segment joint body with a coating material, and then heat drying to form the outer peripheral wall are carried out.

In recent years, from the viewpoint of improving the yield of raw materials and reducing the amount of waste, it has been required to recycle waste material generated in the manufacturing process of a honeycomb structure containing silicon carbide. Conventionally, studies have been made for collecting defective honeycomb formed bodies before firing and reusing them as a raw material. On the other hand, waste materials such as defective products and scraps generated in the process after firing the formed body have been considered to adversely affect the quality of the honeycomb structure. For this reason, the current situation is that technological development for recovering the waste material generated in the process after firing the honeycomb formed body and reusing it as a raw material for the honeycomb structure has not progressed so much. However, as an example of the prior art for utilizing the waste material after firing the honeycomb formed body containing silicon carbide as a raw material, there is a technique described in Patent Literature 1 (Japanese Patent Publication No. 2011-168438).

In Patent Literature 1, there is proposed a method for manufacturing a silicon carbide honeycomb structure by recovering a recycled raw material from the material constituting the silicon carbide honeycomb structure in the process after firing the initial raw material of the silicon carbide honeycomb structure, adjusting the average particle diameter of the recycled raw material to 5 to 100 μm, and then adding it as a part of the initial raw material of the silicon carbide honeycomb structure so that its proportion in the total initial raw material is 50% by mass or less. Further, as an alternative, there is proposed a method of adding the recycled raw material as a part of the initial raw material of the silicon carbide honeycomb structure so that its proportion in the total initial raw material is 50% by mass or less, and then adjusting the average particle diameter to 5 to 100 μm, and using it for manufacturing a silicon carbide honeycomb structure. According to the method for manufacturing a silicon carbide honeycomb structure described in Patent Literature 1, it is described that a honeycomb structure having characteristics such as thermal conductivity, strength, and porosity comparable to those in the case where recycled materials are not used can be manufactured.

CITATION LIST

Patent Literature

[Patent Literature 1] Japanese Patent Application Publication No. 2011-168438

SUMMARY OF THE INVENTION

The technique described in Patent Literature 1 is significant in that it provides a technique for recovering and reusing waste material generated in the process after firing a honeycomb formed body containing silicon carbide in order to manufacture a honeycomb structure containing silicon carbide. However, this technique is still under development and there is room for improvement. Specifically, according to the study results of the present inventors, there is a problem that the honeycomb structure containing silicon carbide manufactured by using a recycled raw material according to the technique of Patent Literature 1 cannot constantly achieve good thermal conductivity. If the thermal conductivity is lowered, the durability of the honeycomb structure containing silicon carbide as a product is lowered, which should be avoided. Further, as the thermal conductivity is higher, it is the easier for soot to burn during filter regeneration, so that filter regeneration can be performed in a short time. Further, it is possible to reduce the difference of the temperature between the inner and outer peripheries when the honeycomb structure is heated.

Further, the honeycomb structure containing silicon carbide manufactured by using a recycled raw material according to the technique of Patent Literature 1 has room for improvement in terms of obtaining a good collection efficiency constantly when used as a filter.

The present invention has been created in view of the above circumstances, and in one embodiment, an object is to provide a method for constantly manufacturing a honeycomb structure containing silicon carbide in which the decrease in thermal conductivity and the decrease in collection efficiency are suppressed when a recycled raw material derived from the material constituting a honeycomb structure containing silicon carbide in the process after firing is reused as an initial raw material for a honeycomb structure containing silicon carbide.

The present inventors have made a diligent study to solve the above problems, and found that, though Patent Literature 1 states that the average particle diameter of the recycled raw material powder is adjusted to 5 to 100 µm, it is not sufficient, and adjusting D10 and D50 of the recycled raw material powder to predetermined conditions is effective in suppressing the decrease in thermal conductivity. The present invention has been completed based on the above findings, and is exemplified as below.

[1]

A method for manufacturing a honeycomb structure containing silicon carbide, comprising blending a recycled raw material derived from a material constituting a first honeycomb structure containing silicon carbide in a process after firing as a part of an initial raw material for a second honeycomb structure containing silicon carbide, wherein the initial raw material comprises silicon carbide and metallic silicon; and the recycled raw material is a powder recovered from the material constituting the first honeycomb structure containing silicon carbide in the process after firing, and after being recovered, a particle size of which has been adjusted so that a 10% diameter (D10) is 10 µm or more and a 50% diameter (D50) is 35 µm or less when a cumulative particle size distribution on a volume basis is measured by a laser diffraction/scattering method.

[2]

The method according to [1], wherein the recycled raw material is the powder in which the particle size has been adjusted so that the 10% diameter (D10) is 15 µm or more when the cumulative particle size distribution on the volume basis is measured by the laser diffraction/scattering method.

[3]

The method according to [1] or [2], wherein the recycled raw material is the powder in which the particle size has been adjusted so that a 90% diameter (D90) is 60 µm or less, when the cumulative particle size distribution on the volume basis is measured by the laser diffraction/scattering method.

[4]

The method according to any one of [1] to [3], comprising blending the recycled raw material in the initial raw material so that a ratio of the recycled raw material to a total mass of the silicon carbide, the metallic silicon, and the recycled raw material is 20 to 80% by mass.

According to one embodiment of the present invention, it is possible to constantly manufacture a honeycomb structure containing silicon carbide in which the decrease in thermal conductivity is suppressed in a case where a recycled raw material derived from the material constituting a honeycomb structure containing silicon carbide in the process after firing is used. Therefore, according to one embodiment of the present invention, it is possible to contribute to the improvement of the yield of raw material and the reduction of the amount of waste in the industrial production of the honeycomb structure containing silicon carbide.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

According to one embodiment of the present invention, there is provided a method for manufacturing a honeycomb structure containing silicon carbide, comprising blending a recycled raw material derived from a material constituting a first honeycomb structure containing silicon carbide in a process after firing as a part of an initial raw material for a second honeycomb structure containing silicon carbide.

1. Recycled Raw Material

The recycled raw material is not particularly limited as long as it is derived from the material constituting a first honeycomb structure containing silicon carbide in a process after firing. However, typically, it is derived from a defective fired product of a honeycomb structure containing silicon carbide obtained by firing a honeycomb formed body containing silicon carbide. This fired product may be fired using only the virgin raw material, or may be fired using a mixture of the virgin raw material and a recycled raw material. Further, when a honeycomb structure containing silicon carbide is manufactured by joining and integrating a plurality of honeycomb structure segments with a joining material, the recycled raw material may be derived from: (1) a defective product of honeycomb structure segment (a fired product); (2) a defective product of segment joint body formed by joining a plurality of honeycomb structure segments via a joining material (in addition to the honeycomb structure segment which is a fired product, the joining material which is not a fired product is included); (3) grinding powder generated when the outer peripheral portion of the segment joint body is ground to obtain a desired shape (for example, a cylindrical shape) (in addition to the honeycomb structure segment which is a fired product, the joining material which is not a fired product is included); (4) a defective finished product obtained through a process of applying a coating material to the outer peripheral side surface of the segment joint body and then drying and heat-treating to form an outer peripheral wall (in addition to the honeycomb structure segment which is a fired product, the joining material and the coating material which are not fired product are included).

Therefore, the recycled raw material may comprise not only a fired product constituting the main body of the honeycomb structure containing silicon carbide, but also an unfired material such as a joining material and a coating material for the outer periphery. From the viewpoint of impurities, it is preferable that 80% by mass or more of the recycled raw material be the fired product, and it is more preferable that 90% by mass or more of the recycled raw material be the fired product. In particular, in the recycled raw material, silicon carbide-silicon composite material, which is a fired product, is preferably 70% by mass or more, and more preferably 80% by mass or more.

It is desirable that the recycled raw material is a powder recovered from the material constituting the first honeycomb structure containing silicon carbide in the process after firing, and after being recovered, a particle size of which has been adjusted so that a 10% diameter (D10) is 10 µm or more and a 50% diameter (D50) is 35 µm or less when a cumulative particle size distribution on a volume basis is measured by a laser diffraction/scattering method. By adjusting D10 and D50 in the above range, it becomes possible to constantly manufacture a second honeycomb structure containing silicon carbide in which a decrease in thermal conductivity is suppressed when the recycled raw material is used. Further, when the second honeycomb structure containing silicon carbide is used as an exhaust gas filter, it is possible to suppress a decrease in collection efficiency. The particle size adjustment can be carried out, for example, by performing known techniques such as pulverization and sieving after recovering the material constituting the first honeycomb structure containing silicon carbide in the process after firing.

The lower limit of D10 of the recycled raw material is preferably 10 µm or more, more preferably 15 µm or more, and even more preferably 20 µm or more, from the viewpoint of increasing the thermal conductivity of the second honeycomb structure containing silicon carbide. The upper limit of D10 of the recycled raw material is not particularly limited, and it is naturally 35 µm or less because the upper limit of D50 is 35 µm. The upper limit of D10 of the recycled raw material is typically 30 µm or less, and more typically 25 µm or less.

The D50 of the recycled raw material has a correlation with the "≥40 µm pore volume ratio", and the smaller the D50 is, the smaller the "≥40 µm pore volume ratio" tends to be. The "≥40 µm pore volume ratio" refers to the volume ratio of pores of 40 µm or more in the total pore volume in the partition walls. Further, the "40 µm pore volume ratio" correlates with the collection efficiency of particulate matter (PM) such as soot by the filter, and the smaller the "≥40 µm pore volume ratio" is, the better the collection efficiency of PM becomes. Therefore, the D50 of the recycled raw material is preferably 35 µm or less, more preferably 30 µm or less, and even more preferably 25 µm or less, from the viewpoint of improving the collection efficiency. The lower limit of D50 of the recycled raw material is not particularly limited, but it is naturally 10 µm or more because the lower limit of D10 is 10 µm. The lower limit of D10 is typically 15 µm or more, and more typically 20 µm or more.

Therefore, in a preferred embodiment, the recycled raw material is a powder in which the particle size is adjusted so that D10 is 15 µm or more and D50 is 30 µm or less. In another preferred embodiment, the recycled raw material is a powder in which the particle size is adjusted so that D10 is 20 µm or more and D50 is 30 µm or less. In yet another preferred embodiment, the recycled raw material is a powder in which the particle size is adjusted so that D10 is 15 µm or more and D50 is 25 µm or less.

Further, it is desirable that the recycled raw material is a powder in which the particle size is adjusted so that a 90% diameter (D90) is 60 µm or less, when the cumulative particle size distribution on the volume basis is measured by the laser diffraction/scattering method. By setting the D90 of the recycled raw material to 60 µm or less, preferably 50 µm or less, good formability can be ensured and good productivity can be obtained. Although the lower limit of D90 of the recycled raw material D90 is not particularly limited, it is typically 35 µm or more, and more typically 40 µm or more.

2. Initial Raw Material

The recycled material may be blended as a part of the initial raw material for manufacturing a second honeycomb structure containing silicon carbide. In one embodiment, the initial raw material for the second honeycomb structure containing silicon carbide comprises silicon carbide and metallic silicon, and further comprises the recycled raw material. The ratio of the recycled raw material to the total mass of silicon carbide, metallic silicon, and the recycled raw material is preferably 20 to 80% by mass. Considering the general amount of waste material generated in an industrial production line of honeycomb structures containing silicon carbide, if the ratio of the recycled raw material is 20% by mass or more, preferably 30% by mass or more, it is possible to almost use up the waste material generated in the manufacturing process of the honeycomb structure containing silicon carbide. Further, when the ratio of the recycled raw material is 80% by mass or less, good formability can be ensured and good productivity can be obtained, and it is also possible to prevent deterioration of the characteristics of the second honeycomb structure containing silicon carbide. From the viewpoint of ensuring good characteristics and formability of the second honeycomb structure containing silicon carbide, the ratio of the recycled raw material is preferably 70% by mass or less, more preferably 60% by mass or less, and even more preferably 50% by mass or less.

In one embodiment, the silicon carbide blended in the initial raw material for manufacturing the second honeycomb structure containing silicon carbide is in the form of powder. In this case, D50 of the silicon carbide particles constituting the silicon carbide powder is preferably 5 µm or more, more preferably 10 µm or more, and even more preferably 15 µm or more, from the viewpoint of reducing the pressure loss. Further, D50 of the silicon carbide particles constituting the silicon carbide powder is preferably 60 µm or less, more preferably 50 µm or less, and even more preferably 40 µm or less, from the viewpoint of enhancing the collection performance as a filter. In the present invention, D50 of the silicon carbide particles refers to the 50% diameter of the silicon carbide powder when a cumulative particle size distribution on a volume basis is measured by a laser diffraction/scattering method.

By blending metallic silicon in the initial raw material for manufacturing the second honeycomb structure containing silicon carbide, a composite material of silicon carbide and metallic silicon can be obtained after firing. In one embodiment, the metallic silicon blended in the initial raw material is in the form of powder. In this case, D50 of the metallic silicon particles constituting the metallic silicon powder is preferably 10 µm or less, more preferably 8 µm or less, and even more preferably 6 µm or less, from the viewpoint of increasing the strength of the fired body. As the finer metallic silicon particles are more preferable, the lower limit of D50 is not particularly limited, but from the viewpoint of availability, D50 of the metallic silicon particles is usually 3 µm or more. In the present invention, D50 of the metallic silicon particles refers to the 50% diameter of the metallic silicon powder when a cumulative particle size distribution on a volume basis is measured by a laser diffraction/scattering method.

Among the above initial raw materials, when the total mass of the silicon carbide and the metallic silicon (excluding the silicon carbide and the metallic silicon contained in the recycled raw material) is set as 100 parts by mass, the concentration of the metallic silicon is preferably 14 parts by mass or more, and more preferably 16 parts by mass or more, for the reason of increasing the strength of the fired body. In addition, when the total mass of the silicon carbide and the metallic silicon (excluding the silicon carbide and the metallic silicon contained in the recycled raw material) is set as 100 parts by mass, the concentration of the metallic silicon is preferably 24 parts by mass or less, and more preferably 22 parts by mass or less, for the reason of suppressing deformation during firing.

The initial raw material for the second honeycomb structure containing silicon carbide may further comprise an organic binder. Examples of the organic binder include, but are not limited to, methyl cellulose, hydroxypropyl methyl cellulose, hydroxypropoxyl cellulose, hydroxyethyl cellulose, carboxymethyl cellulose, polyvinyl alcohol and the like. As the organic binder, one type may be contained alone, or two or more types may be contained in combination.

For the reason of enhancing the shape retention ability of the formed body, the concentration of the organic binder in the initial raw material is preferably 3 parts by mass or more, more preferably 4 parts by mass or more, and even more preferably 5 parts by mass or more, with respect to a total of 100 parts by mass of the silicon carbide, the metallic silicon and the recycled raw material. In addition, from the viewpoint of reducing the drying shrinkage, the concentration of the binder in the initial raw material is preferably 10 parts by mass or less, more preferably 9 parts by mass or less, and even more preferably 8 parts by mass or less, with respect to the total of 100 parts by mass of the silicon carbide, the metallic silicon and the recycled raw material.

The initial raw material for the second honeycomb structure containing silicon carbide may further comprise a pore-former. For example, when the honeycomb structure containing silicon carbide is used as an exhaust gas filter, a pore-former may be blended in the initial raw material for the purpose of increasing the porosity. The blending amount of the pore-former may be, for example, 40 parts by mass or less, and typically 1 to 25 parts by mass, with respect to the total of 100 parts by mass of the silicon carbide, the metallic silicon, and the recycled raw material.

The type of the pore-former used is not particularly limited, but examples thereof include graphite, formable resin, foamed resin, wheat flour, starch, phenolic resin, polymethylmethacrylate, polyethylene, polymethacrylate, polyethylene terephthalate and the like. As the pore-former, one type may be contained alone, or two or more types may be contained in combination.

The initial raw material of the second honeycomb structure containing silicon carbide may further contain an alkaline earth metal in order to improve the wettability of the metallic silicon during firing. The blending amount of the alkaline earth metal may be, for example, 5 parts by mass or less, and typically 1 to 3 parts by mass, with respect to the total of 100 parts by mass of the silicon carbide, the metallic silicon, and the recycled raw material. The type of alkaline earth metal used is not particularly limited, but examples thereof include calcium and strontium. As the alkaline earth metal, one type may be contained alone, or two or more types may be contained in combination.

3. Method for Manufacturing Second Honeycomb Structure Containing Silicon Carbide The second honeycomb structure containing silicon carbide may be manufactured, for example, by performing a step of extrusion molding a green body formed by mixing and kneading the above-mentioned initial raw material comprising the recycled raw material to obtain a honeycomb formed body having a predetermined honeycomb structure, and a step of calcining the obtained honeycomb formed body to remove the organic binder in the formed body, and then a step of firing. Hereinafter, each step will be described as an example.

In one embodiment, by extrusion molding a green body, it is possible to manufacture a honeycomb formed body comprising a pillar-shaped honeycomb structure portion having an outer peripheral side wall, and a plurality of partition walls disposed on the inner peripheral side of the outer peripheral side wall, the plurality of partition walls partitioning a plurality of cells forming flow paths for fluid from an end surface to the other end surface. During the extrusion molding, a die having a desired overall shape, cell shape, partition wall thickness, cell density and the like may be used.

Next, the obtained undried formed body is dried to remove water. Drying may be carried out, for example, by applying hot gas of about 120 to 160° C. to the formed body. It is desirable to use caution so that the organic substances do not decompose during drying.

The shape of the cells in the cross section perpendicular to the flow path direction of the cells is not limited, but is preferably a quadrangle, a hexagon, an octagon, or a combination thereof. Among these, a square and a hexagon are preferred. By making the cell shape in this way, it is possible to reduce the pressure loss when a gas is passed through the honeycomb formed body after firing.

The shape of the honeycomb formed body is not limited, but for example, it may be a pillar shape with a circular end surface (cylindrical shape), a pillar shape with an oval-shaped end surface, and a pillar shape with a polygonal end surface (quadrangle, pentagon, hexagon, heptagon, octagon, and the like), and the like.

For the dried honeycomb formed body, it is possible to carry out a step of obtaining a degreased body by heat-removing organic substances such as the binder (a degreasing step) after forming sealing portions on both end surfaces as necessary. The method of forming the sealing portions on both end surfaces is not particularly limited, and a well-known technique such as filling the cell openings with a sealing slurry while attaching a predetermined mask on the end surface may be adopted. The heating temperature of the formed body in the degreasing step may be, for example, 400 to 500° C., and the heating time at the heating temperature may be, for example, 1 to 3 hours.

The atmosphere for carrying out the degreasing step may be, for example, an air atmosphere, an inert atmosphere, or a reduced pressure atmosphere. Among these, an inert atmosphere and a reduced pressure atmosphere are preferable from the viewpoint of preventing insufficient joining between the silicon carbide and the metallic silicon due to oxidation of the silicon carbide and of easily reducing oxides contained in the raw material. However, when the degreasing step is carried out in an inert atmosphere and a reduced pressure atmosphere, it takes a very long time. Moreover, since the degreasing temperature is not so high, the formed body is unlikely to be oxidized even if it is carried out in an air atmosphere. Therefore, considering the balance between production efficiency and quality, it is preferable to carry out the degreasing step in an air atmosphere.

A honeycomb structure containing silicon carbide is manufactured by firing the dried formed body or the degreased formed body in an inert atmosphere. It is also possible to carry out the degreasing step and the firing step together using a continuous furnace. The firing temperature may be, for example, 1400 to 1500° C., and the heating time at the firing temperature may be, for example, 0.1 to 3 hours.

The porosity of the partition walls of the second honeycomb structure containing silicon carbide obtained by carrying out the firing step is not particularly limited, but is preferably 35% or more, and more preferably 40% or more, from the viewpoint of reducing the pressure loss. However, from the viewpoint of durability, the porosity is preferably 70% or less, more preferably 65% or less. In the present specification, the porosity refers to a value measured by a method of mercury intrusion method.

From the viewpoint of ensuring durability, the thermal conductivity of the partition walls of the second honeycomb structure containing silicon carbide obtained by carrying out the firing step is preferably 15 W/(m·K) or more, more preferably 17 W/(m·K) or more, even more preferably 19 W/(m·K) or more, and may be, for example, 15 to 23 W/(m·K). In the present specification, the thermal conductivity of the partition walls of the second honeycomb structure containing silicon carbide refers to the value at 50° C. measured by a steady state method.

The "≥40 μm pore volume ratio" of the partition walls of the second honeycomb structure containing silicon carbide obtained by carrying out the firing step is preferably 7% or less, and more preferably 6% or less, from the viewpoint of increasing the collection efficiency of particulate matter when the honeycomb structure is used as a filter. The "≥40 μm pore volume ratio" of the partition walls of the second honeycomb structure containing silicon carbide refers to a value measured from the cumulative pore diameter distribution curve obtained by the mercury intrusion method specified in JIS R1655: 2003.

The second honeycomb structure containing silicon carbide itself obtained by carrying out the firing step may be used as a finished product. In another embodiment, a plurality of the second honeycomb structure containing silicon carbide may be each used as a honeycomb structure segment, and the side surfaces of these segments may be joined to each other via a joining material, and the segmented joint body obtained by heat-drying may be used as a finished product of the second honeycomb structure containing silicon carbide. In yet another embodiment, the outer peripheral portion of the segment joint body may be ground to form a desired shape (for example, a cylindrical shape), and by applying a coating material to the outer peripheral side surface, and then by drying and heat treating to form an outer peripheral wall, a finished product may be obtained. The temperature of the heat treatment may be, for example, 400 to 700° C.

As the joining material, a known joining material may be used. As the joining material, for example, a material prepared by mixing a ceramic powder, a dispersion medium (for example, water or the like), and, if necessary, an additive such as a binder, a peptizing agent, and a foamed resin may be used. Examples of the ceramics include cordierite, mullite, zirconium phosphate, aluminum titanate, silicon carbide, silicon-silicon carbide composite (for example, Si-bonded SiC), cordierite-silicon carbide composite, zirconia, spinel, indialite, sapphirine, corundum, titania, silicon nitride, and the like, and a silicon-silicon carbide composite material is more preferable. Examples of the binder include polyvinyl alcohol and methyl cellulose.

As the coating material, a known outer peripheral coating material can be used. The outer peripheral coating material may be obtained, for example, by adding additives such as an organic binder, a foamed resin and a dispersant as well as water to inorganic raw materials such as an inorganic fiber, a colloidal silica, a clay, and ceramic particles, and kneading them into a slurry. Further, the coating method of the outer peripheral coating material is not particularly limited, and a known method can be used.

When the second honeycomb structure containing silicon carbide is used as an exhaust gas filter, an appropriate catalyst may be carried depending on the application. As a method of carrying the catalyst on the filter, for example, there is a method comprising introducing a catalyst slurry into the cells by a conventionally known suction method or the like and adhering it to the surface and pores of the partition walls, and then performing a high-temperature treatment to bake the catalyst contained in the catalyst slurry onto the partition walls.

Examples of the catalyst include, but are not limited to, an oxidation catalyst (DOC) for raising the exhaust gas temperature due to oxidative combustion of hydrocarbons (HC) and carbon monoxide (CO), a PM combustion catalyst that assists the combustion of PM such as soot, an SCR catalyst and an NSR catalyst for removing nitrogen oxides (NOx), and a three-way catalyst that can simultaneously remove hydrocarbons (HC), carbon monoxide (CO) and nitrogen oxides (NOx) can be mentioned. The catalyst may appropriately comprise, for example, noble metals (Pt, Pd, Rh, and the like), alkali metals (Li, Na, K, Cs, and the like), alkaline earth metals (Ca, Ba, Sr, and the like), rare earths (Ce, Sm, Gd, Nd, Y, Zr, Ca, La, Pr, and the like), transition metals (Mn, Fe, Co, Ni, Cu, Zn, Sc, Ti, V, Cr, and the like) and the like.

Examples

1. Manufacture of First Honeycomb Structure Containing Silicon Carbide 80 parts by mass of silicon carbide powder with D50 of 30 μm, 20 parts by mass of metallic silicon powder with D50 of 5 μm, 2 parts by mass of starch (pore-former), 5 parts by mass of hydroxypropyl methylcellulose (organic binder), and 2 parts by mass of strontium carbonate were prepared, and these were mixed in powder, and after adding water, the mixture was kneaded using a kneader. The obtained kneaded clay was extrusion molded with an extrusion molding machine through a predetermined die to form a rectangular parallelepiped honeycomb formed body. The honeycomb formed body had a pillar-shaped honeycomb structure portion having an outer peripheral side wall, and a plurality of partition walls disposed on the inner peripheral side of the outer peripheral side wall, the plurality of partition walls partitioning a plurality of cells forming flow paths for fluid from one end surface to the other end surface.

After microwave-drying the honeycomb formed body, it was dried at 120° C. for 2 hours using a hot gas dryer, and necessary processing such as cutting both end surfaces by a predetermined length was performed to prepare a rectangular parallelepiped honeycomb dried body having a length of 35 mm, a width of 35 mm, a height (the direction in which the cells extend) of 160 mm, a partition wall thickness of 300 μm, and a cell density of 47 cells/cm$^2$. Next, after alternately forming sealing portions so as to have the checkered pattern at the cell ends on both end surfaces of the honeycomb dried body, the honeycomb dried body was placed in a continuous electric furnace and degreased (removal of binder) by heating at 450° C. or lower for 2 hours in an air atmosphere to obtain a honeycomb degreased body. Next, the honeycomb degreased body was fired at 1450° C. for 2 hours in an airc atmosphere to obtain a honeycomb structure (a honeycomb segment) containing silicon carbide.

Next, 16 honeycomb segments obtained by the above manufacturing method were prepared, and the side surfaces thereof were joined to each other in an array of 4 segments in the vertical direction×4 segments in the horizontal direction via a joining material containing silicon carbide and ceramic fibers, and by heat-drying at 140° C., a segment joint body was obtained. The outer peripheral portion of the segmented joint body was ground into a cylindrical shape, and a coating material containing silicon carbide is applied to the entire outer peripheral side surface, and then heat-dried at 600° C. to form an outer peripheral coating layer having a thickness of 0.2 mm, thereby preparing a first honeycomb structure containing silicon carbide.

2. Manufacture of Second Honeycomb Structure Containing Silicon Carbide

The defective honeycomb segments after firing, defective segment joint bodies, outer peripheral grinding powder, and defective finished products generated in the process of industrially manufacturing the first honeycomb structure containing silicon carbide were collected, and by pulverizing them with a roller mill and sieving, recycled raw materials having various particle size distributions (D10, D50, D90) according to the test numbers shown in Table 1 were obtained. The content of the silicon carbide-silicon composite material (fired product) in the recycled raw material was 90% by mass.

Silicon carbide powder with D50 of 30 μm and metallic silicon powder with D50 of 5 μm were prepared at a mass ratio of silicon carbide powder:metallic silicon powder=4:1. Further, recycled raw material was prepared so that the ratio of the recycled raw material to the total mass of the silicon carbide powder, the metallic silicon powder, and the recycled raw material was each value shown in Table 1. The ratio of the recycled material was varied from 0% by mass to 90% by mass in each test number. Next, 5 parts by mass of hydroxypropylmethyl cellulose (organic binder), 2 parts by mass of starch (pore-former), and 2 parts by mass of strontium carbonate were prepared with respect to a total of 100 parts by mass of the silicon carbide, the metallic silicon, and the recycled raw material. These were dry-mixed together with the silicon carbide powder, the metallic silicon powder, and the recycled raw material, and after adding water, the mixture was kneaded with a kneader. The obtained kneaded clay was extrusion molded with an extrusion molding machine through a predetermined die to form a rectangular parallelepiped honeycomb formed body. The honeycomb formed body had a pillar-shaped honeycomb structure portion having an outer peripheral side wall, and a plurality of partition walls disposed on the inner peripheral side of the outer peripheral side wall, the plurality of partition walls partitioning a plurality of cells forming flow paths for fluid from one end surface to the other end surface.

After microwave-drying the honeycomb formed body, it was dried at 120° C. for 2 hours using a hot gas dryer, and necessary processing such as cutting both end surfaces by a predetermined length was performed to prepare a rectangular parallelepiped honeycomb dried body having a length of 35 mm, a width of 35 mm, a height (the direction in which the cells extend) of 160 mm, a partition wall thickness of 300 μm, and a cell density of 47 cells/cm². Next, after alternately forming sealing portions so as to have the checkered pattern at the cell ends on both end surfaces of the honeycomb dried body, the honeycomb dried body was placed in a continuous electric furnace and degreased (removal of binder) by heating at 450° C. or lower for 2 hours in an air atmosphere to obtain a honeycomb degreased body. Next, the honeycomb degreased body was fired at 1450° C. for 2 hours in an air atmosphere to obtain a second honeycomb structure (a honeycomb segment) containing silicon carbide.

3. Porosity

A sample of about 1 cm square was cut out from the second honeycomb structure containing silicon carbide obtained above, and the porosity (%) was measured under the condition of mercury intrusion pressure of 0.6 to 10000 psia by the mercury intrusion method (available from Shimadzu Corporation, model AUTOPORE) specified in JIS R1655: 2003. The results are shown in Table 1. The measurement was performed on a plurality of second honeycomb structures containing silicon carbide, and in the second honeycomb structures containing silicon carbide manufactured under the same conditions, substantially the same measurement results were constantly obtained.

4. Thermal Conductivity

From the second honeycomb structure containing silicon carbide obtained above, a sample was obtained by slicing it in a direction perpendicular to the flow path with a thickness of about 20 mm, and the thermal conductivity (W/(m·K)) at 50° C. was measured by a steady state method (available from ULVAC-RIKO, model GH-1S). The results are shown in Table 1. The measurement was performed on a plurality of second honeycomb structures containing silicon carbide, and in the second honeycomb structures containing silicon carbide manufactured under the same conditions, substantially the same measurement results were constantly obtained.

5. ≥40 μm Pore Volume Ratio

From the cumulative pore diameter distribution curve obtained by measuring the porosity, the volume of pores of 40 μm or more was obtained, and the ratio with respect to the total pore volume was calculated. The measurement was performed on a plurality of second honeycomb structures containing silicon carbide, and in the second honeycomb structures containing silicon carbide manufactured under the same conditions, substantially the same measurement results were constantly obtained.

6. Forming Pitch

In the process of manufacturing the second honeycomb structure containing silicon carbide, the forming rate was measured by a laser speedometer, and the forming pitch (seconds/piece) when the above-mentioned green body was extrusion molded was calculated by dividing the length of each honeycomb formed body by the forming rate. The results are shown in Table 1.

TABLE 1

|  | D10 | D50 | D90 | Recycled raw material ratio (%) | 0 | 20 | 50 | 80 | 90 |
|---|---|---|---|---|---|---|---|---|---|
| Comparative Example 1 | 5 | 30 | 50 | Porosity (%) | 41 | 41 | 41 | 41 | 41 |
|  |  |  |  | Thermal conductivity (W/(m · K)) | 23 | 21 | 18 | 13 | 12 |
|  |  |  |  | ≥40 um pore volume ratio (%) | 5 | 6 | 6 | 7 | 7 |
|  |  |  |  | Forming pitch (seconds/piece) | 6 | 6 | 6 | 6 | 6 |
| Example 1 | 10 | 30 | 50 | Porosity (%) | 41 | 41 | 41 | 41 | 41 |
|  |  |  |  | Thermal conductivity (W/(m · K)) | 23 | 22 | 20 | 17 | 16 |

TABLE 1-continued

| | D10 | D50 | D90 | Recycled raw material ratio (%) | 0 | 20 | 50 | 80 | 90 |
|---|---|---|---|---|---|---|---|---|---|
| | | | | ≥40 um pore volume ratio (%) | 5 | 6 | 6 | 7 | 7 |
| | | | | Forming pitch (seconds/piece) | 6 | 6 | 6 | 6 | 6 |
| Example 2 | 15 | 30 | 50 | Porosity (%) | 41 | 41 | 41 | 41 | 41 |
| | | | | Thermal conductivity (W/(m · K)) | 23 | 22 | 21 | 19 | 18 |
| | | | | ≥40 um pore volume ratio (%) | 5 | 6 | 6 | 7 | 7 |
| | | | | Forming pitch (seconds/piece) | 6 | 6 | 6 | 6 | 6 |
| Example 3 | 20 | 30 | 50 | Porosity (%) | 41 | 41 | 41 | 41 | 41 |
| | | | | Thermal conductivity (W/(m · K)) | 23 | 23 | 22 | 20 | 20 |
| | | | | ≥40 um pore volume ratio (%) | 5 | 6 | 6 | 7 | 7 |
| | | | | Forming pitch (seconds/piece) | 6 | 6 | 6 | 6 | 6 |
| Example 4 | 15 | 20 | 60 | Porosity (%) | 41 | 41 | 41 | 41 | 41 |
| | | | | Thermal conductivity (W/(m · K)) | 23 | 22 | 21 | 19 | 18 |
| | | | | ≥40 um pore volume ratio (%) | 5 | 5 | 5 | 6 | 6 |
| | | | | Forming pitch (seconds/piece) | 6 | 6 | 6 | 6 | 7 |
| Example 5 | 15 | 30 | 60 | Porosity (%) | 41 | 41 | 41 | 41 | 41 |
| | | | | Thermal conductivity (W/(m · K)) | 23 | 22 | 21 | 19 | 18 |
| | | | | ≥40 um pore volume ratio (%) | 5 | 6 | 6 | 7 | 7 |
| | | | | Forming pitch (seconds/piece) | 6 | 6 | 6 | 6 | 7 |
| Example 6 | 15 | 35 | 60 | Porosity (%) | 41 | 41 | 41 | 41 | 41 |
| | | | | Thermal conductivity (W/(m · K)) | 23 | 22 | 21 | 19 | 18 |
| | | | | ≥40 um pore volume ratio (%) | 5 | 6 | 6 | 7 | 7 |
| | | | | Forming pitch (seconds/piece) | 6 | 6 | 6 | 6 | 7 |
| Comparative Example 2 | 15 | 40 | 60 | Porosity (%) | 41 | 41 | 41 | 41 | 41 |
| | | | | Thermal conductivity (W/(m · K)) | 23 | 22 | 21 | 19 | 18 |
| | | | | ≥40 um pore volume ratio (%) | 5 | 6 | 7 | 8 | 8 |
| | | | | Forming pitch (seconds/piece) | 6 | 6 | 6 | 6 | 6 |
| Example 7 | 15 | 25 | 50 | Porosity (%) | 41 | 41 | 41 | 41 | 41 |
| | | | | Thermal conductivity (W/(m · K)) | 23 | 22 | 21 | 19 | 18 |
| | | | | ≥40 um pore volume ratio (%) | 5 | 5 | 6 | 6 | 6 |
| | | | | Forming pitch (seconds/piece) | 6 | 6 | 6 | 6 | 6 |
| Example 8 | 15 | 25 | 60 | Porosity (%) | 41 | 41 | 41 | 41 | 41 |
| | | | | Thermal conductivity (W/(m · K)) | 23 | 22 | 21 | 19 | 18 |
| | | | | ≥40 um pore volume ratio (%) | 5 | 5 | 6 | 6 | 6 |
| | | | | Forming pitch (seconds/piece) | 6 | 6 | 6 | 6 | 7 |
| Example 9 | 15 | 25 | 70 | Porosity (%) | 41 | 41 | 41 | 41 | 41 |
| | | | | Thermal conductivity (W/(m · K)) | 23 | 22 | 21 | 19 | 18 |
| | | | | ≥40 um pore volume ratio (%) | 5 | 5 | 6 | 6 | 6 |
| | | | | Forming pitch (seconds/piece) | 6 | 6 | 6 | 9 | 9 |

7 Discussion

As can be seen from Table 1, in all the test examples, the thermal conductivity tended to decrease as the ratio of the recycled raw material was increased. However, in Examples 1 to 9, since the D10 and D50 of the recycled raw materials were appropriately adjusted with respect to Comparative Examples 1 and 2, the decrease in thermal conductivity was suppressed, and furthermore, the increase in the ≥40 μm pore volume ratio which is related to the collection efficiency was also suppressed. Further, by comparing Examples 7 to 9, it can be seen that the increase in the forming pitch was suppressed by appropriately adjusting the D90 of the recycled raw material.

8. Relation Between 40 μm Pore Volume Ratio and Filter Collection Efficiency

In the process of manufacturing the first honeycomb structure containing silicon carbide, by changing the average particle size of the pore-former, honeycomb structures containing silicon carbide having various "≥40 μm pore volume ratios" in the range of 6% to 9% were obtained. Using each honeycomb structure containing silicon carbide as a DPF, the number of particulate matters (PN) emitted in the exhaust gas when operated under European regulation driving mode (NEDC) was measured by the measurement method in accordance with PMP (Particle Measurement Programme protocol in European regulation). As a result, it was found that there is a high correlation with the coefficient of determination ($R^2$)=0.9551 between "≥40 μm pore volume ratio" and PN. That is, it was found that there is a high correlation between the ≥40 μm pore volume ratio and the filter collection efficiency.

The invention claimed is:

1. A method for manufacturing a honeycomb structure containing silicon carbide, comprising blending a recycled raw material derived from a material constituting a first honeycomb structure containing silicon carbide in a process after firing as a part of an initial raw material for a second honeycomb structure containing silicon carbide,
    wherein the initial raw material comprises silicon carbide and metallic silicon; and
    the recycled raw material is a powder recovered from the material constituting the first honeycomb structure containing silicon carbide in the process after firing, and after being recovered, a particle size of which has been adjusted so that a 10% diameter (D10) is 10 μm or more and a 50% diameter (D50) is 15 μm or more and 35 μm or less when a cumulative particle size distribution on a volume basis is measured by a laser diffraction method or laser scattering method.

2. The method according to claim 1, wherein the recycled raw material is the powder in which the particle size has been adjusted so that the 10% diameter (D10) is 15 μm or more when the cumulative particle size distribution on the volume basis is measured by the laser diffraction method or laser scattering method.

3. The method according to claim 1, wherein the recycled raw material is the powder in which the particle size has been adjusted so that a 90% diameter (D90) is 60 μm or less when the cumulative particle size distribution on the volume basis is measured by the laser diffraction method or laser scattering method.

4. The method according to claim 1, comprising blending the recycled raw material in the initial raw material so that a ratio of the recycled raw material to a total mass of the silicon carbide, the metallic silicon, and the recycled raw material is 20 to 80% by mass.

* * * * *